May 29, 1962 E. J. ZEITLIN ET AL 3,036,767

PREDETERMINING COUNTER

Filed July 26, 1957 3 Sheets-Sheet 1

INVENTORS
EDWARD J. ZEITLIN
LEE LEIGHTON
JOSEPH GAON

BY Howard J. Jeandron
ATTORNEY

INVENTORS
EDWARD J. ZEITLIN
LEE LEIGHTON
JOSEPH GAON
BY Howard T. Jeandron
ATTORNEY

PREDETERMINING COUNTER

Filed July 26, 1957 3 Sheets-Sheet 3

INVENTORS
EDWARD J. ZEITLIN
LEE LEIGHTON
JOSEPH GAON
BY Howard J. Jeanson
ATTORNEY 3,036,767

PREDETERMINING COUNTER

Edward J. Zeitlin and Lee Leighton, Peekskill, and Joseph Gaon, Forest Hills, N.Y., assignors to Standard Instrument Corporation, New York, N.Y.

Filed July 26, 1957, Ser. No. 674,346
4 Claims. (Cl. 235—132)

This invention relates to improvements in counting devices. More particularly, it relates to a counting device which is capable of counting from zero to a predetermined number, reversing itself when the predetermined number is reached and then counting back again to zero. This device also contemplates continuous automatic operation, that is, a device which continues to count from zero to any predetermined number to reverse itself and count back to zero and again reverse itself for continuous operation.

Predetermining counters, which will count a predetermined number of times and, upon being manually reset, again to count to that total are well known in the art. One example of such a counter is described and claimed in U.S. Patent No. 2,040,026, dated May 5, 1939, entitled "Counters," and issued to Harvey L. Spaunburg.

It is also well known in the art to provide a continuous counter wherein the resetting of predetermining and counting wheels may be accomplished automatically as in Patent #2,313,189, dated March 9, 1943, entitled "Predetermining Counter," and issued to Nathanial C. Wyeth. In the above mentioned continuous counter there are mechanically operated ratchet wheeled counters. In every instance the counter must be connected to a reset or predetermining wheel so that for every number counted the predetermining wheel will be automatically reset to repeat the number.

It is the object of this invention to provide a continuous counting device which can be set to count a definite number of operations and provide a pulse output, then reverse its direction and make the same count back again and provide a pulse output and again reverse for continuous operation.

It is a further object of this invention to provide a continuous counting device that is electrically actuated to count a definite number of electrical impulses and provide a single pulse output and then reverse its direction of operation and make the same number of pulse counts back to zero and provide another pulse output and again reverse for continuous operation.

A still further object of this invention is to provide a counting device which is electrically actuated and which can be set to count a definite number of pulsations and provide a pulse output and then by means of an electronic reversing circuit, reverse its direction of counting and make the same count of pulsations back to zero and again provide a pulse output and by means of the same electronic reversing circuit again reverse for continuous operation.

It is also an object of the invention to provide apparatus controlled by a tape that is formed into a loop for repeatedly counting a predetermined number an indefinite number of times and supplying a single pulse output after each counting operation.

It is also an object of the invention to provide apparatus controlled by a plurality of tapes that are formed into loops in which the tapes are simultaneously driven to provide a count equal to the number of pulses from one tape times the number of pulses from the other tape and supplying a single pulse output after each counting operation.

It is also one of the objects of the invention to provide counting apparatus for repeat or duplicate counting which may be readily set for any specific number to be counted within the capacity of the apparatus.

Others objects of this invention may be apparent by reference to the accompanying detailed description and the drawings in which.

Figures 1, 4:
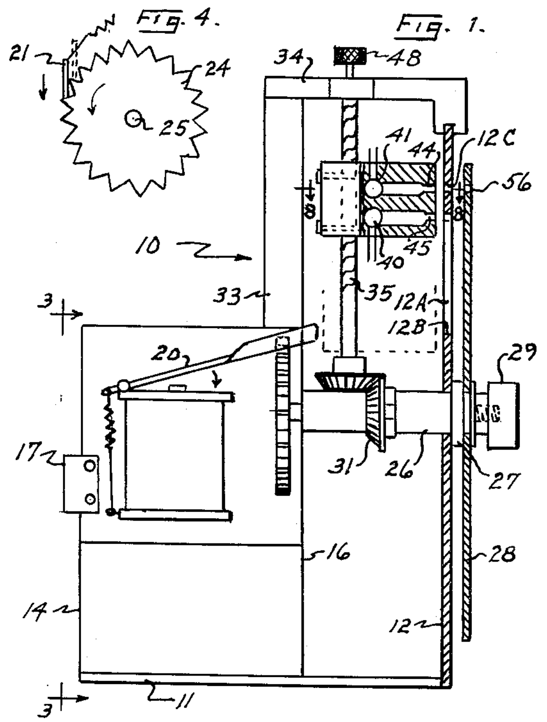
FIG. 1 is a side elevational view of the counter.
FIG. 4 is en enlarged detail of the impulse actuated driving gear.
Figures 3, 8:
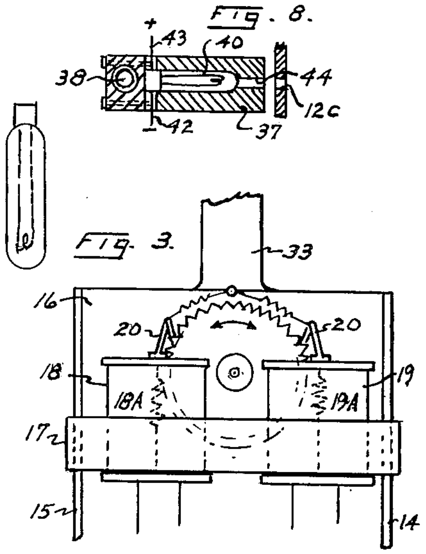
FIG. 3 is a rear elevational view taken of line 3—3 of FIG. 1.
Figures 6, 7:
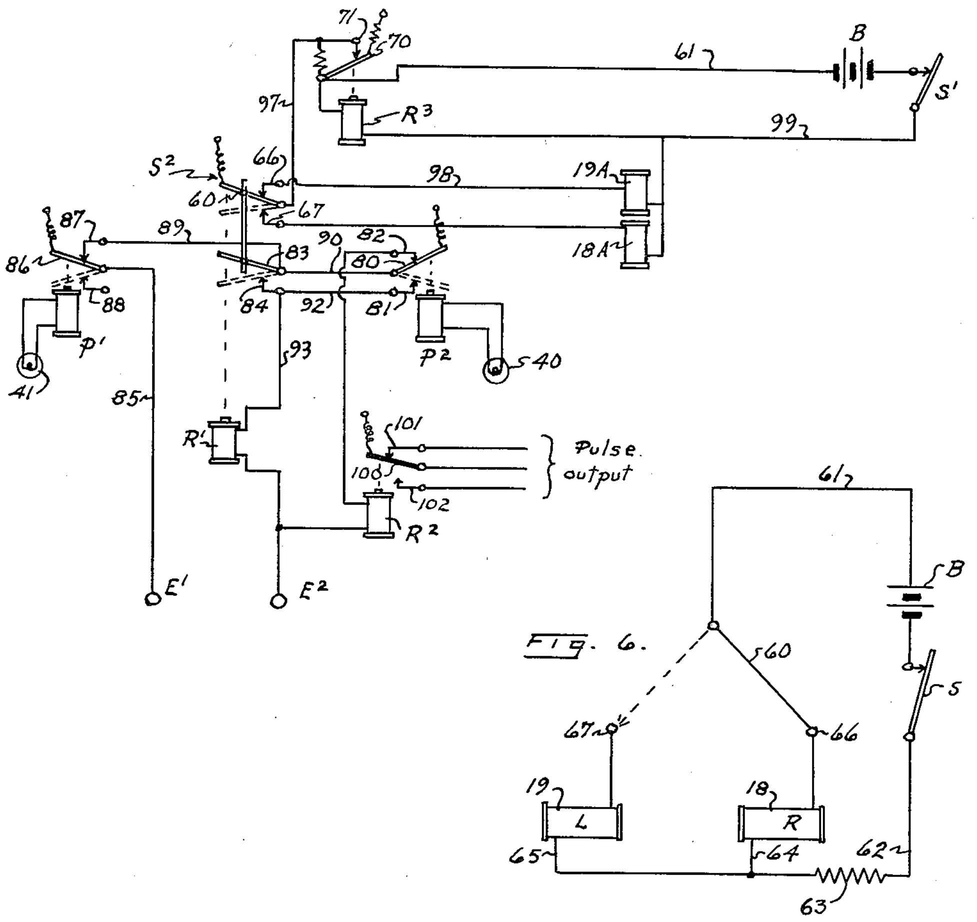
Figures 9, 10, 11:
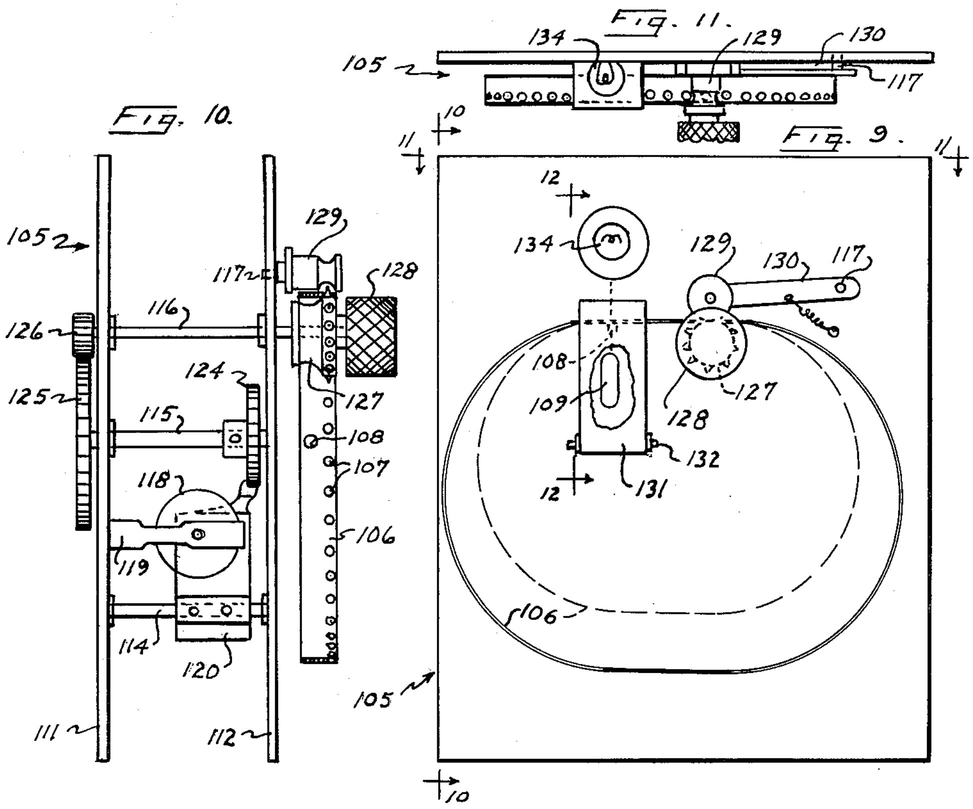
Figure 12:
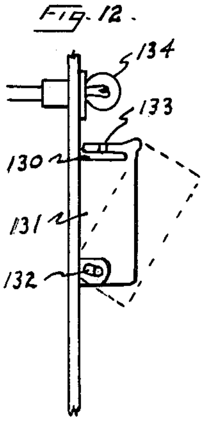
Figure 13:
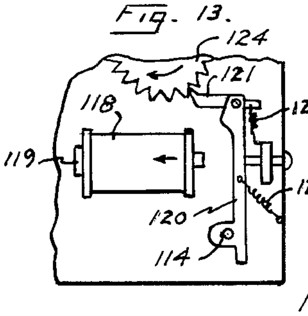
Figure 14:
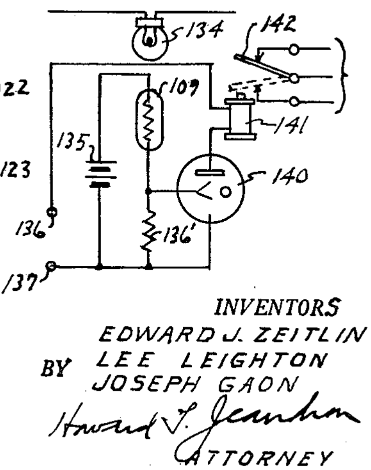

FIG. 6 is a schematic illustration of the circuit control for the device of FIG. 1, FIG. 7 is a schematic illustration of the counter operating circuit and reversing circuit, FIG. 8 is a cross sectional view taken on line 8—8 of FIG. 1, FIG. 9 is a front elevational view of a further embodiment, FIG. 10 is a side elevational view taken on line 10—10 of FIG. 9, FIG. 11 is a top view taken on line 11—11 of FIG. 9, FIG. 12 is a side elevational detail taken on line 12—12 of FIG. 9, FIG. 13 is an enlarged detail of the solenoid motor drive, and FIG. 14 is a schematic illustration of the circuit used to operate the device illustrated in FIG. 9.

Referring to the drawings and particularly FIG. 1, there is illustrated a counter 10 which is comprised of a supporting framework including a base 11, a front panel 12, a pair of parallel spaced elements 14 and 15 that rest upon the base 11 and are joined by a panel 16 also supported on base 11 to form a generally U-shaped structure. A supporting band 17 is affixed across the open portion of the U structure, being affixed by screws or bolts to elements 14 and 15. Mounted within the U-shaped structure are a pair of relays or solenoids 18 and 19 positioned in parallel relationship and spaced a predetermined distance apart. The solenoids may be supported by the bands 17 in any manner of attachment to retain them in a rigid position. The solenoids 18 and 19 are each provided with a pivotally magnetically actuated element 20. Element 20 will be drawn toward the solenoid body for each time that the solenoid is energized. The elements 20 are provided at their upper end with a blade shaped structure 21 and the upper end of the elements 20 are each connected by a spring to a set point 23 mounted in panel 16, thus each time that either solenoid is energized pulling either element 20 toward the solenoid. When the solenoid is deenergized the springs 18A and 19A will pivotally pull and return the elements 20 to their original position. The springs attached to 23 will also pull elements 20 toward gear 24 in position to contact the next tooth. Mounted between solenoid 18 and 19 is a circular gear 24 provided with teeth about its circumference in which the teeth are spaced to provide equal flat faces on either side. Gear 24 is mounted on a shaft 25 and shaft 25 in turn mounted through a bearing in panel 16 and shaft 25 passes through gear 31 and in turn through a bearing 26 mounted in the front panel 12 and extends therefrom to permit mounting a spacer 27 and the control card 28 and the shaft 25 is threaded at its external end to permit threading a lock nut 29 thereon so that lock nut 29 may be utilized to lock and retain card 28 fixed with relation to shaft 25. Referring to panel 12 it is to be noted that panel 12 is provided with a cut out portion 12A which extends from a shoulder 12B to a shoulder 12C in the upper portion of panel 12.

Referring to FIGS. 3 and 4 it is apparent that the solenoids 18 and 19 must be set at an exact distance apart so that the elements 20 will be in a position tangential to gear 24 and in an exact position to permit blade end 21 to aline with and bear upon the flat surface of one tooth of gear 24, when the element 20 is pulled downward by the energization of the solenoid. Since only one solenoid is energized at a time then only element 21 will contact a tooth of gear 24 to move gear 24 one step for each pulse or energization of a solenoid and due to the springs connected with element 20, the elements will be returned to their original position after each pulse. It is apparent, therefore, that the direction of rotation of gear 24 will be dependent upon which solenoid 18 or 19 is being activated by the incoming pulses. For example, if solenoid 18 is receiving the incoming pulses gear 24 will be moved one step in a counter clockwise direction for each pulse and vice versa for solenoid 19.

Referring again to FIG. 1, it is to be noted that gear 31 is keyed to shaft 25 to be rotated in unison with shaft 21. Panel 16 is provided with an extended portion 33 which supports the clamp 34. Clamp 34 is affixed to the upper end of portion 33 and at its opposite end rests upon and is clamped to the upper edge of panel 12. Clamp 34 in this rigid position supports a shaft 35 which is freely rotatable and supported by a bearing in clamp 34. Shaft 35 at its lower end is provided with a gear 36 to mesh with gear 31. Gear 36 is in turn keyed or affixed to shaft 35 to rotate shaft 35. The upper end of shaft 35 is cut in the form of a worm. Block 37 illustrated in FIGS. 1 and 8 is mounted on shaft 35 to move up and down the length of the worm. Therefore, block 37 at one end thereof is provided with a bore 38 that is cut with a matching worm thread to ride upon the worm area in shaft 35. Block 37 is positioned between shaft 35 and panel 12. The front face of block 37 bearing against the back face of plate 12 thus retaining block 37 in the position as illustrated but permitting block 37 to move up or down based on the rotation of shaft 35. Block 37 is utilized to encase two photo electric cells 40 and 41. The cells 40 and 41 are positioned in a parallel spaced relationship one above the other and each cell is provided with two connecting wires 42 and 43. The block 37 is also provided with a pair of apertures 44 and 45. The apertures extend from the front face of block 37 to the cavity in which the photo electric cells are retained within block 37 to thus permit the penetration of a light beam through the apertures 44 or 45 to the respective cells 40 or 41. It is to be noted that shaft 35 is provided with an extended element 48 above clamp 34 to permit manual adjustments and thus provide the means to set block 37 at a zero position for each new operation of this device.

Figure 2:
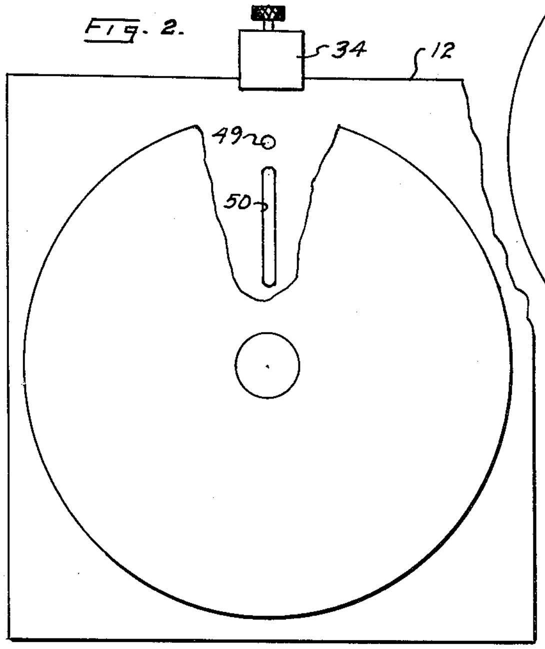
FIG. 2 is a front elevational view taken of line 2—2 of FIG. 1.

Referring to FIG. 2, it is to be noted that there are a pair of apertures 49 and 50 in plate 12. These apertures must be spaced precisely the same distance apart as the apertures 44 and 45 in block 37 for a starting operation, and further apertures 49 and 50 must be positioned parallel with the axis of shaft 35 which is the axis on which block 37 will move. Aperture 49 is the zero point or starting point for all counting operations. Aperture 50 is in reality slot 12A of panel 12.

Figure 5:
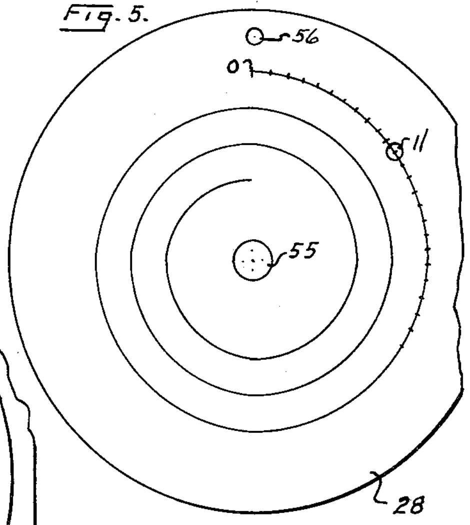
FIG. 5 is a plan view of the counting control disc.

Referring to FIG. 5 there is illustrated a plan view of disc 28. Disc 28 may be circular in form as it is to be rotated. Disc 28 is provided with a central aperture 55, aperture 55 being large enough to permit mounting disc 28 on shaft 25 as illustrated in FIG. 1. Disc 28 is provided with a small starting aperture 56. Aperture 56 should be positioned the same distance from the center of disc 28 as aperture 49 is spaced from the central aperture in panel 12, as aperture 56 must align with aperture 49 when disc 28 is mounted on shaft 25 and aperture 56 must be of sufficient size to permit a light beam to pass through aperture 56 and through aperture 49. The disc 28 is also provided with a spiral path or graph. The exact form of the spiral being dependent upon the rotation of disc 28 and the movement of block 37, that is, for each pulse of one solenoid moving block 37 downward from the starting position as illustrated in FIG. 1. The spiral must move toward the center to the same degree that the block 37 moves for each pulse. For example, as illustrated in FIG. 5, the spiral is marked with calibrations, and the disc 28 has been punched to provide a perforation at the 11th mark.

It will be apparent why a spiral has been chosen for the disc 28 to control the operation of this device. It is to be remembered that with disc 28 mounted as in FIG. 1 and with aperture 56 of the disc aligned with the starting aperture 49 in plate 12, when solenoid 19 is energized disc 28 will be rotated one calibration for each pulse of the solenoid and at the same time block 37 will move downward to a degree. The movement of block 37 either downward or upward must be in perfect coordination with the rotation of disc 28 whether clockwise or counter clockwise respectively so that aperture 45 in block 37 is at all times in alignment with the spiral on disc 28. Thus as in this example (FIG. 5) when disc 28 has been rotated counter clockwise by means of 11 pulsations of the solenoid the punched aperture at the 11th calibration should have moved to the central horizontal axis on which block 37 is moving down. Thus aperture 11 will align with aperture 45 of block 37 permitting the light source to pass through to photo cell 41 which stops the counter clockwise rotation and reverses the electronic control circuit and starts the pulsations on the opposite solenoid 18 to thus rotate disc 28 clockwise until the disc has been moved with 11 pulsations to in turn move disc 28 back to the position illustrated in FIG. 5, at which time the starting aperture 56 will again align with aperture 49 in plate 12 and aperture 44 in block 37 to thus energize photo cell 40. This in turn stops the rotation of disc 28 and starts the rotation of disc 28 in the opposite or counter clockwise direction due to the reversal of the electronic circuit.

Referring to FIG. 6, there is illustrated schematically the simplified control circuit for the device illustrated in FIG. 1 wherein for purposes of simplicity solenoid 19 has been marked with an "L" indicating left, while solenoid 18 has been marked with an "R" indicating right. A battery "B" is connected on one side to the master switch 60 by a lead 61 while the opposite side of the battery is connected to a switch S, the opposite side of switch S is connected by a lead 62 to a resistance 63. The opposite side of resistance 63 is in turn connected by a lead 64 to solenoid 18 and by a lead 65 to solenoid 19. The opposite lead from solenoid 18 is connected to a contact 66 of the master switch 60 and the opposite lead of solenoid 19 is connected to a contact 67 of the master switch 60.

Referring to the diagram, it is apparent that when the master switch 60 is in position as illustrated in FIG. 6, the circuit from the battery "B" will be through lead 62 through lead 64 through the solenoid 18 through contact 66 through master switch 60 through lead 61 back to the opposite side of battery "B," thus solenoid 18 will continue to pulse rotating disc 28 to the right or clockwise until master switch 60 breaks the contact with 66. When the circuit is broken disc 28 will stop and when the master switch 60 is moved to contact 67, the circuit will then energize solenoid 19 and thus rotate disc 28 to the left or counter clockwise.

Referring to FIG. 7, there is illustrated schematically the electronic control circuit to produce the energization of the drive solenoids and reversal of the drive solenoid switch S2 from contact 66 to contact 67 and from contact 67 to 66. Thus when the device as illustrated in FIG. 1 is set with disc 28 in a starting position and a light source providing a light beam that will pass through aperture 56 through aperture 49 and aperture 44 to energize photo-cell 41, the electronic circuit will thus become energized to in turn energize the drive solenoid 19 and in fact prepare the circuit so that the master switch S1 may close the circuit and for each pulsation the drive solenoid 19 will move disc 28 in a counter clockwise direction (FIG. 5).

Referring to FIG. 7, there is illustrated the schematic circuit which produces the reversal of the direction of rotation of the selector disc 28 at the completion of each cycle of operation. In addition, the schematic circuit also produces an output pulse at the end of each cycle of operation. In order that we may follow the circuit from a deenergized starting condition, let us assume that the circuit in FIG. 7 is deenergized. In addition with the circuit in its deenergized condition, we must presume that the disc 28 has been positioned with the aperture 56 in front of or in alignment with photo-cell 41. We must first connect power to the circuit by means of the two terminals E1 and E2. With photo-cell 41 energized, relay P1 will in turn be energized and the contact arm 86 will be pulled down against the contact 88. This conditions the circuit for starting operation. Switch S1 is to be operated by the device being monitored by this circuit. The device operating switch S1 is not shown. For each closing of switch S1 by the monitoring device, relay R3 will be energized and in turn drive solenoid 19A will be energized.

The circuit may be followed starting with the closed switch S1 going through battery "B," through lead 61, through contact arm 70, through contact 71, through line 97 to contact arm 60, through contact 66, through line 98, through drive solenoid 19 from the opposite side of the solenoid through lead 99 to the opposite side of the closed switch.

With the energization of relay R3, contact arm 70 will be pulled down breaking its contact with 71. A holding circuit is maintained by means of the resistance connected between contact arm 70 and lead 97.

As switch S1 continues to pulse with each closing, disc 28 will rotate counter clockwise (FIG. 5) until aperture 11 is in alignment with photo-cell 40. With the energization of photo-cell 40, relay P2 will be energized. This will, in turn, reverse the circuit already described energizing drive solenoid 18. At the same time it will reverse the contact of the output relay closing the output circuit.

With the energization of P2, contact arm 80 will be pulled down to close with contact 81. The power circuit may be followed from E1 through lead 85 to contact arm 86, through contact 87, through lead 89 to contact arm 83, through lead 90 to contact arm 80, through contact 81 through lead 92 to contact 84 to lead 93 through relay R1, and in turn to the opposite terminal E2 of the power source.

With relay R1 energized, contact arm 83 will be pulled down closing with contact 84. This eliminates the necessity of P2 holding the circuit closed and thus provides the holding circuit to relay R1. And in addition, relay R1 closes arm 60 to contact 67, thus reversing the original circuit from drive solenoid 19A to the drive solenoid 18A.

Referring back to the initial condition of the circuit as deenergized, relay R2 being deenergized, the contact arm 100 of the output circuit will be retained on contact 101 by a spring biased switch. When power is applied through E1, E2, to energize the circuit, relay R2 will be energized and in turn will open the output circuit as described and reverse contact arm 100 to contact 102, thus closing the opposite output circuit.

Referring back to the energization of relay P2, when this occurs arm 80 was pulled down to contact 81, thus breaking the circuit through relay R2 and allowing contact arm 100 to be returned to its original biased position against contact 101.

With the circuit reversed and drive solenoid 18 energized, the next pulse will therefore drive disc 28 in a clockwise direction. With the next pulse provided by switch S1, relay 2 will be deenergized because the photo-cell 40 is in turn deenergized by the movement of aperture 11 out of alignment with photo-cell 40 and in turn with the deenergization of P2 contact arm 80 will close with contact 82 reestablishing the circuit through relay R2 and in turn closing contact arm 100 to contact 102 reestablishing the opposite output circuit.

With each closing of S1, the drive solenoid 18A will drive disc 28 in a clockwise direction until aperture 56 is in alignment with photo-cell 41 at which time photo-cell 41 will energize relay P1. The energization of P1 will in turn break the locking circuit through relay R1 which reverses contact arm 60 from contact 67 to contact 66 also breaking the circuit through relay R2 allowing the output circuit to again reverse, thus reestablishing the circuit to the original position when originally energized.

Referring to FIGURES 9 through 13, there is illustrated a further embodiment of this invention which comprises a counter 105. The counter 105 is similar to the counter 10 of FIGURES 1 and 2 except that in this embodiment the counter is driven in a clockwise direction and is not reversible. Also in this embodiment the controlling means for the counter is a film strip or paper strip 106 formed into a continuous band or loop as shown in FIGURE 9. The strip 106 must be provided with a plurality of apertures 107 on one edge similar to the ordinary movie film strip so that the strip 106 can be moved one step for each actuation of the counter 105 and the film strip 106 will be formed with the desired or predetermined number of steps. For example, if the counter is to count 50 and the repeat of a count of 50, strip 106 will be comprised of a loop having 50 apertures 107 thus having 50 steps or actuations.

The film or strip 106 is provided with a single starting light aperture 108. Aperture 108 must be positioned as illustrated in FIGURE 9 directly under the source of light to permit energizing the photo-electric cell 109. This starts or energizes the circuit illustrated in FIGURE 14 and the device will continue to step or operate until aperture 108 is again in alignment with the light source at which time a second pulse output will be produced to indicate that the count of 50 has been completed and the device will again repeat before the next output pulse will indicate the next count of 50.

In this embodiment the mechanical device utilized is comprised of a pair of mounting panels 111 and 112 spaced in parallel and retained in their parallel relationship by shafts 114, 115 and 116. The manner of retaining panels 111 and 112 with these shafts may be in any well-known fashion such as spotting washers on the shafts to retain the panels as illustrated and still permit the shafts to be freely rotatable.

Panel 112 is also provided with an aperture in which a bolt or pin 117 is mounted. Panel 111 provides the support for the solenoid 118 which is mounted to a bracket 119, the bracket 119 in turn being mounted to the inner face of panel 111. Mounted on the shaft 114 is an armature 120 that is actuated by solenoid 118, armature 120 being pivotal with shaft 114, shaft 114 being rotatable between panels 111 and 112.

Armature 120 is provided with an operating tooth 121 at one end thereof and tooth 121 is positioned to bear against the teeth of a gear 124. Tooth 121 is retained in its operating position by a spring 122 so that it will engage the teeth and move gear 124 when solenoid 118 is energized. However the spring will allow tooth 121 to ride over the teeth of gear 124 when solenoid 118 is de-energized and spring 123 will return the armature to the position as illustrated in FIGURE 13.

Gear 124 is affixed to shaft 115 and at the opposite end of shaft 115 there is a gear 125 also rigidly affixed to the shaft. Above gear 125 is a gear 126 that is in mesh with gear 125. Gear 126 is in turn affixed to shaft 116 to be rotated therewith. Shaft 116 on its opposite end is provided with a sprocket 127 and a manual adjusting knob 128. The pin 117 supports a pivotal arm 130 and at the opposite end of arm 130 there is a rotatable element 129. A spring is mounted below arm 130 to retain element 129 in contact with sprocket 127. However, the film 106 is mounted between sprocket 127 and element 129. Thus the film or strip 106 will be retained on sprocket 127 at all times, thus for each actuation of solenoid 118 due to the movement of armature 120 in turn the movement of gear 124 which in turn moves gears 125 and 126 thus moving sprocket 127 one step which in turn moves strip 106 one step.

Strip 106 is also mounted so that it passes through a slot 130 in the photo-electric cell holding element 131. Element 131 is pivotally mounted on either side by pins 132. Thus element 131 may be moved to the dotted position illustrated in FIGURE 12 to permit the strip 106 to be mounted in slot 130. Element 131 is then returned to the position illustrated in FIGURE 12.

It is to be noted that there is a small aperture 133 in the upper portion of element 131 to permit the light from lamp 134 to pass through the strip 106 when aperture 108 is in the position illustrated in FIGURE 9.

The photo-electric cell 108 is mounted in element 131 and is connected to an operating circuit as illustrated in FIGURE 14. The photo-cell 109 is connected to a battery 135. The battery in turn is connected on the opposite side through a resistance 136 back to photo-cell 109. This is simply the bias while a second circuit, a 70-volt triggering voltage, is connected to terminals 136 and 137. Terminal 137 is connected to the thyratron 140 while the opposite terminal 136 is connected to the solenoid 141. The opposite side or plate of the thyratron is connected to the opposite side of solenoid 141. Thus when light from the lamp 134 energizes photo-cell 109, the triggering circuit through the thyratron 140 will energize solenoid 141 and thus pull armature 142 to the dotted position. This output circuit is in turn connected to external means not shown to indicate each outgoing pulse as explained above for each complete actuation of the strip 106 in this example 50 steps.

The next energization of photo-cell 109 will produce the energization of solenoid 141 and thus the closing of the output circuit to produce an indication of the count of 50. Of course the output pulse may be utilized to actuate any device as desired.

Referring to FIGURE 9 there is illustrated a single strip 106, in a further embodiment of this invention, two strips 106 may be utilized. When two strips are utilized they are placed in parallel, side by side relationship through element 109 and of course in mating relationship for the sprocket 127 so that both strips will be moved in the same step by step relationship. The reason for using two strips will be apparent taking a simple example if the first strip 106 has 12 steps to make a complete cycle and the second strip has a different number of steps (the numbers being prime, having no common divisor but one, or the number being prime or relatively as for example 12 is prime to 25) such as 25 steps to make a complete cycle, if the starting apertures 108 on both strips are positioned in the starting position as shown is FIGURE 9, the two strips will continue to rotate the sum of 12 times 25 or 300 steps before the two apertures 108 will again be in alignment with the light source in the starting position as illustrated. Thus it is apparent that any combination of two strips will produce the number of pulses provided by the number on each strip multiplied before returning to the starting position to produce the outgoing pulse (the second strip cannot be a multiple of the steps in the first strip, as the apertures 108 would align before the complete cycle has been completed).

It is also apparent that a simple pulse actuated counter may be connected to the driving solenoid circuit to thus total the number of pulsations so that the total sum of the two strips as multiplied will provide the true visual indication. The output pulse at the end of the counting operation may be utilized to de-energize said totalizer.

It is apparent with the device illustrated in FIGURES 9 through 13 and the circuit of FIGURE 14 that a predetermined number of pulses or counts may be produced where a number of articles are to be counted and it is desirable to continue counting the articles in the same number and in which it is desirable to produce a pulse or indication for each repeat count. The device is primarily an indicating counter and by means of the tape 106 it becomes a definite predetermined counter that may be operated indefinitely. It is apparent that strip 106 may be set for any desired number of counts. Although we have illustrated a single strip 106, we may also use two strips 106 simultaneously. In such case the count of the device will be the number of pulses on one strip times the number of pulses on the other strip before reaching the end of one cycle of counting. It is also apparent that although the device has been described as actuated by an electrical circuit to energize solenoid 118 to produce each step of the strip 106, it is also within the realm of this invention to drive shaft 116 directly from any driven mechanism using the proper gearing 125 and 126 to produce one step of strip 106 for each operation of a device to be counted without departing from the spirit of this invention. It is apparent that any counting operation where a predetermined number of counts are to be made and repeated may be produced with either the device of FIGURES 1 and 2 or the device illustrated in FIGURES 9 through 13. Each device has its particular merits. The first device having the limitation of the end of spiral as to the number of counts it can make in one direction before reversing while the second device is limited to the length of the strip 106 that is feasible to use as a continuous strip. Various changes or combinations may be made as desired to produce similar results without departing from the spirit of this invention. This invention shall be limited only by the appended claims.

What is claimed is:

1. A repeating predetermining counting apparatus which comprises in combination a lamp and photo-cell in which said lamp energizes said photo-cell, a triggering circuit that is connected to said photo-cell, an operating circuit that is energized by said triggering circuit, an electro-magnet means in said triggering circuit having an operative or inoperative position, said photo-cell when energized providing an impulse through said triggering circuit to energize said electro-magnet means to an operative position, means for activating said operating circuit to produce an outgoing pulse for each said impulse, a ratchet wheel and sprocket, pawl means cooperating with said ratchet wheel, an article responsive second electro-magnetic means, said article responsive electro-magnetic means being energized each time an article is counted, said second electro-magnet moving said pawl means each time it is energized to effect corresponding movement of said ratchet wheel and sprocket in one direction of rotation, a strip of film formed as a loop and positioned to pass over said sprocket, said film loop having a predetermined number of steps of movement over said sprocket, said photo-cell being positioned adjacent said film, and said lamp positioned on the opposite side of said film in line with said photo-cell, an aperture in said film to allow said lamp to momentarily energize said photo-cell each time said aperture is in alignment with said lamp and said photo-cell.

2. In a device according to claim 1 in which a plurality of strips of film in the form of a loop are utilized each strip having a different number of apertures, no two strips being similar in the number of apertures or a multiple of each other to provide a predetermined number of impulses that is equal to the sum of the number of pulses indicated on one film times the sum of pulses indicated on a second film.

3. In a device according to claim 1 in which a plurality of strips of film in the form of a loop are utilized each strip having a different number of apertures, no two strips being similar in the number of apertures or a multiple of each other to provide a predetermined number of impulses that is equal to the sum of the number of pulses indicated on one film times the sum of pulses indicated on a second film and a counter connected to said electromagnetic means to totalize the number of pulses in each cycle of operation.

4. In a device according to claim 1 in which the strip of film formed as a loop may also include a strip of paper formed similar to said film and in which means are provided to form the desired predetermined number of pulse movements for said loop.

References Cited in the file of this patent

UNITED STATES PATENTS

| | | |
|---|---|---|
| 519,494 | Cutter | May 8, 1894 |
| 1,366,938 | Renz | Feb. 1, 1921 |
| 1,444,503 | Hathaway | Feb. 6, 1923 |
| 2,122,710 | Bidwell et al. | July 5, 1938 |
| 2,233,490 | Shields | Mar. 4, 1941 |
| 2,266,862 | Hardey | Dec. 23, 1941 |
| 2,586,173 | Nelson | Feb. 19, 1952 |
| 2,588,107 | Grabay | Mar. 4, 1952 |
| 2,617,593 | Audier et al. | Nov. 11, 1952 |
| 2,656,106 | Stabler | Oct. 20, 1953 |

FOREIGN PATENTS

| | | |
|---|---|---|
| 547,920 | Canada | Oct. 22, 1957 |